Oct. 7, 1969   G. A. SCOFIELD   3,471,354
EMBOSSING APPARATUS
Filed Aug. 19, 1964   3 Sheets-Sheet 2

Oct. 7, 1969      G. A. SCOFIELD      3,471,354

EMBOSSING APPARATUS

Filed Aug. 19, 1964      3 Sheets-Sheet 5

United States Patent Office
3,471,354
Patented Oct. 7, 1969

3,471,354
EMBOSSING APPARATUS
Gerald A. Scofield, Barrington, R.I., assignor to Rohm & Haas Company, Philadelphia, Pa., a corporation of Delaware
Filed Aug. 19, 1964, Ser. No. 390,669
Int. Cl. B31f 1/00
U.S. Cl. 156—590     1 Claim

ABSTRACT OF THE DISCLOSURE

Disclosed herein is an apparatus and a process for preparing embossed designs in heat-settable materials by applying correlated pressure and heat to predetermined portions of the material while it is disposed on a foam sheet being at least ¾ inch thick. Preferably, the material is a sandwich of fabric and resilient material with a curable elastic resin film therebetween. The heat must be sufficient to at least partially set the elastomeric film while the pressure is being applied. Furthermore, the pressure must compress the foam sheet so as to result in an embossed design in the material. Products so produced are exceptionally decorative and the process lends itself to low cost continuous production.

---

This invention relates to a continuous method for the production of a fabric laminate having an embossed design and to an embossing apparatus useful therefor. More particularly, the invention relates to an embossing apparatus for permanently setting a pattern in a thermoplastic material and to a continuous method for the economical production of embossed designs including compound curves in a fabric-surfaced laminate.

The formation of surface patterns in a fabric is normally done by stitching or by adhesives. The adhesives used in obtaining such effects have generally given the product a poor hand and reduced elasticity. The loft and intricacy of the pattern is limited by the ability to sew through the filler material. Stitching also perforates the fabric, making water-proofing difficult. Recently vacuum-forming techniques have been applied to vinyl fabrics whereby decorative effects are obtained. Such effects, however, are limited to slight surface indentations and require the maintenance of a critical temperature in the vacuum-forming operations. Further, the resulting product has a plastic surface rather than a fabric surface.

There have now been developed fabric laminates which may be produced in a variety of designs possessing complex and compound curves while still presenting a fabric surface. Further, the technique makes possible the use of any desired design configuration without regard to the limitations heretofore imposed by the use of conventional sewing equipment. Also, the novel fabric laminates are produced without the necessity for any sewn seams. Such structures comprising a laminate of fabric and a resilient insulating material such as fiberfill (i.e. a sheet of nonwoven staple fibers bonded together by a resin binder) or an elastic plastic foam optionally with a scrim or lining material are described in copending application Ser. No. 390,059, entitled "Fabric Laminate and Process Therefor" filed on Aug. 17, 1964 by Michael Storti, and now abandoned.

These highly useful and novel products are produced in a preferred embodiment described in the aforesaid application by a molding technique employing a special type of male mold (termed a "frame" mold) without the necessity for a corresponding female mold. By thus eliminating the necessity for the perfect matching requisite in a normal molding operation, considerable savings are possible in the construction and use of the mold to produce the novel fabric laminates as described. Despite the advantages resulting from this novel technique of "frame" molding, the molding process remains a batch process not susceptible to continuous production. Vacuum forming may also be used, but it is also subject to difficulties.

Now, in accordance with the instant invention, there have been discovered a process for the production of the aforesaid fabric laminates in a continuous manner and an embossing apparatus useful therefor. Essentially the process of the invention comprises continuously forwarding a fabric in face-to-face relationship with a resilient substrate and a curable elastomeric film therebetween through the nip formed by an embossing roll and an idler roll, the idler roll being covered by a highly resilient compression pad, while applying correlated heat and pressure.

The invention can be understood from the following description together with the accompanying drawings in which.

Figure 6A:
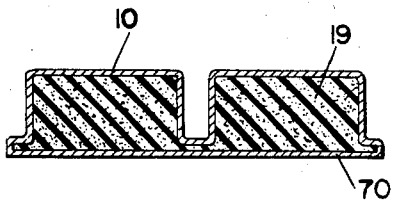
Figure 2:
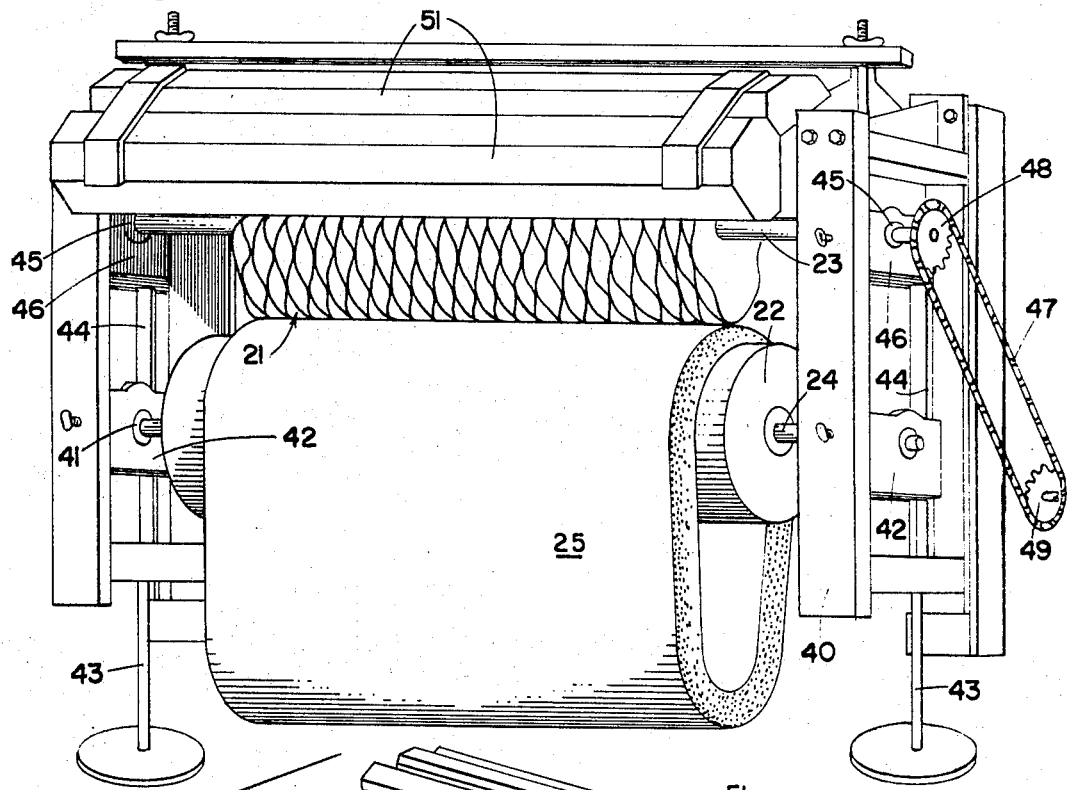
FIGURE 2 is a view showing embossing apparatus according to another embodiment of the invention.
Figure 4A:
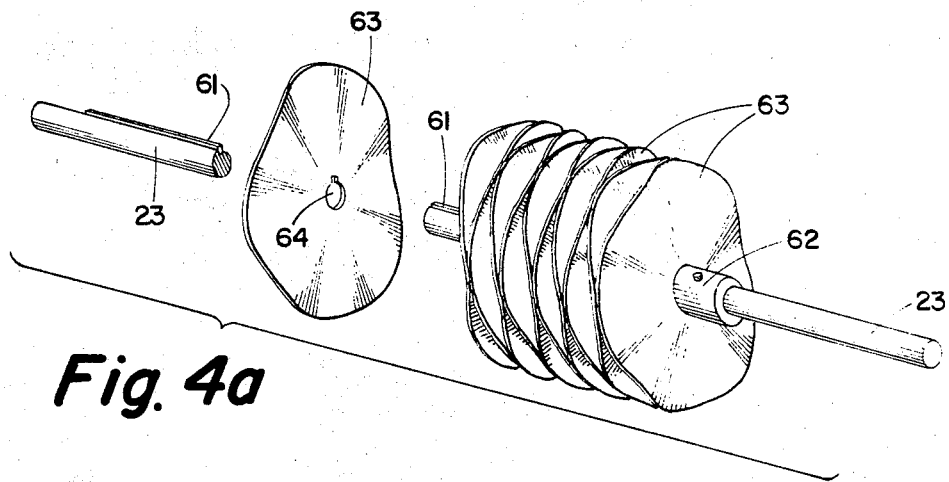
Figure 5:
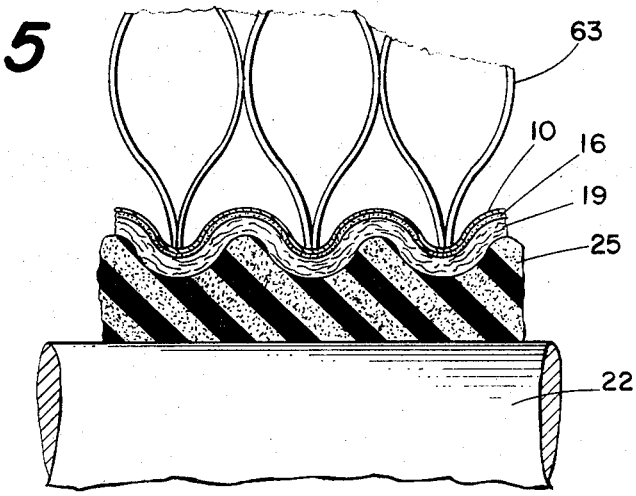

FIGURES 4(a) and (b) show respectively a side view and an plan view of the embossing roll used in the apparatus of FIGURE 2;

FIGURE 5 is a section showing the fabric laminate in section as it passes in contact with the compression pad through the nip between the idler roll and the embossing roll;

FIGURES 6(a), (b) and (c) are cross-sections of fabric laminates produced according to the invention and illustrating the effect of fabric construction.

Throughout, the same reference numerals indicate the same or like parts.

Figure 1:
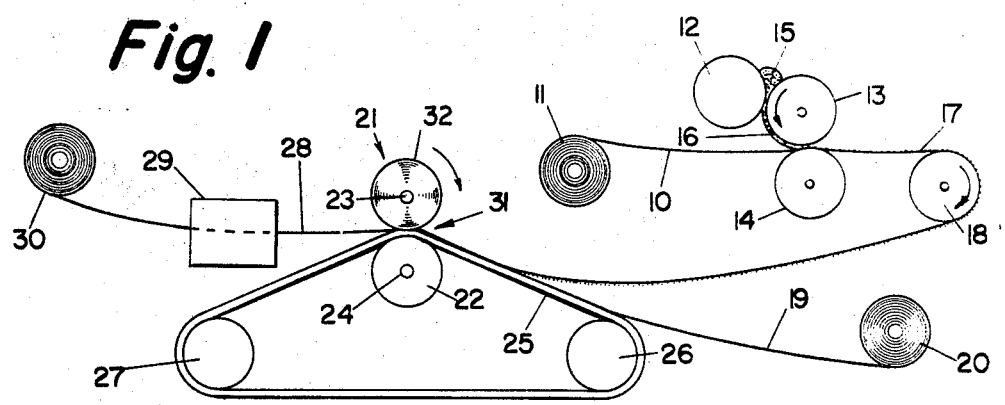
FIGURE 1 is a diagrammatic representation in section of apparatus according to one embodiment of the invention.

A general form of apparatus according to the instant invention is shown in FIGURE 1. A fabric web 10 is fed from a supply roll 11 between a pair or rollers 13 and 14 where it is united with a resin coating. If desired, supply roll 11 may be positively driven to minimize the tension to which the fabric web 10 is subjected. Again, supply roll 11 may be an idler roll with rolls 13 and 14 pulling and slightly tensioning fabric 10.

The resin 15 is calendered between calender rolls 12 and 13 according to conventional procedure. The resulting film 16 of freshly calendered resin is fed around the surface of roller 13 where it is united with the fabric web 10 between rollers 13 and 14. Desirably the longitudinal dimension of the resin film is maintained unchanged from its emergence from the nip of the calender rolls until it is united with the fabric between the rollers 13 and 14. The rollers 13 and 14 apply slight pressure to the fabric-resin composite so that the materials adhere together. Insufficient pressure is applied, however, to cause any material degree of penetration of resin into the fabric.

The composite material 17 is fed around guide roll 18 reversing its direction so that the resin coated surface of composite web 17 is presented to the desired substrate 19 which is fed from a supply roll 20. Supply roll 20 may be positively driven to minimize the tension to which the substrate 19 is subjected. This is particularly desirable where fiberfill or similar material having low strength is used for the substrate. Again, support means as a moving belt may be used to convey the substrate 19 from supply roll 20 to nip 31 between rolls 21 and 22. If desired, where the substrate is sufficiently strong, supply roll 20 may be an idler roll with rolls 21 and 22 pulling and slightly tensioning substrate 19.

The composite web 17 and the substrate web 19 are then united under correlated heat and pressure between rolls 21 and 22 to form composite laminate 28. Roll 21 is a heated embossing roll whose surface 32 contains a 3-dimensional geometrical design consisting of raised and lowered portions of the surface. Embossing roll 21 is positively driven by a suitable means as a variable speed motor (not shown) on its axis or shaft 23 which is journaled in a suitable bearing as known to those skilled in the art. Roll 22 is preferably an idler roll or, if desired, means may be provided to drive roll 22 in synchronism with roll 21. Roll 22 thus rotates on its longitudinal axis or shaft 24 which is also journaled in bearings (not shown). Means are provided whereby the bearing mounts for axes 23 and 24 may be moved relative to each other, preferably vertically, so as to permit the adjustment of the spacing between the surfaces of rolls 21 and 22 and thus to control the pressure exerted between the two rolls.

In passing between the nip 31 formed by rolls 21 and 22, the fabric surface of composite web 17 contacts the geometrical design on the surface 32 of roll 21 while the lower surface of the substrate 19 is separated from roll 22 by means of a highly resilient compression blanket 25. In the embodiment shown, the compression blanket 25 is an endless belt slackly supported by idler roll 22 and by guide rolls 26 and 27.

The effective heat, i.e., the heat actually imparted to the web 17 and substrate 19, is a function of the heat capacity and linear speed of the web 17 and substrate 19, the temperature and diameter of roll 21, and the rate of heat loss in the system. In any given run, these values are all predetermined except for the temperature of roll 21 and the linear speed of web 17 and substrate 19. The pressure applied to web 17 and substrate 19 is a function of the spacing between rolls 21 and 22 (i.e., the size of the nip 31) and the thickness and density of compression blanket 25. Accordingly, these variables must be selected in correlation to each other so as to heat-set the resin and fabric and obtain a stable cured design in the fabric itself. As a result, the fabric 10 and resin coating 16 forming web 17 are heat-set in the desired pattern conforming to the pattern constituting the surface 32 of roll 21 giving an embossed fabric having a predetermined amount of loft and firmly bonded to a substrate 19 over the entire surface of web 17 facing substrate 19, i.e., the bonding is not limited to the raised areas of the pattern.

Where the nature of resin 15 requires, the curing or cross-linking may be completed after the heat-setting by passing the composite laminate 28 through suitable heating means 29 as an oven, dielectric heater, etc. The resulting product is then wound up on a take-up roll 30 or, if desired, may be cut into sheets of desired size and configuration.

Figure 6B:
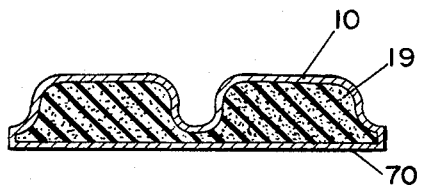
Figure 6C:
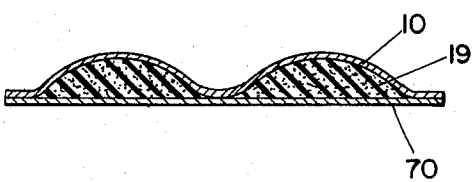

The fabric used in this process is not critical. However, the selection of the fabric does have an important bearing on the nature of the design ultimately obtained in the final composite laminate. Thus, where the fabric possesses all-way stretch as in a circular knit stretch nylon, extremely sharp angles may be embossed in the laminate as shown in FIGURE 6(a) which is representative of the type of design which is obtainable. Where the fabric possesses only one-way stretch as in a tricot knit fabric, compound curves may be reproduced in the laminate as illustrated in FIGURE 6(b). Woven fabrics possessing only a small bias stretch (10% to 20%) permit embossing designs in depth but without the sharpness obtainable with the stretch fabrics, as illustrated in FIGURE 6(c).

As seen, the fabrics may be woven or knit, prepared from either staple or continuous filament, and may contain either stretch or bulk yarns. Fibers used in preparing such textiles include polyamide fibers such as nylon, polyester fibers, such as polyethylene terephthalate, acrylonitrile fibers, etc.; natural fibers, such as wool, silk and cotton; and modified natural fibers, such as rayon, cellulose acetate, cellulose triacetate, etc. Thermoplastic yarns, such as nylon, can be heat-set in stable embossed designs on a suitable substrate without the use of a resin coating. However, by reason of more uniform bonding with the substrate over the entire surface, the use of a resin as described is preferred. When the fabric contains a thermoplastic yarn, both the fabric and the resin coating are permanently set in the design configuration by the molding operation. When the fabric does not contain a thermoplastic yarn, the resin coating will be permanently set. In both cases, the yieldable substrate is permanently set. The selection of a specific fabric will depend not only on the nature of the design desired in a composite laminate but also on the price, wear properties and appearance, since the fabric constitutes the outer surface of the laminate.

The resin used in the instant process must have elastic properties and must be curable. The choice of a specific elastic polymer for the resin depends upon the additional properties desired in the final product, such as washability, dry-cleanability, etc. Curable elastic resins useful in the instant invention include specifically polychloroprene, natural rubber, polyisoprene, polybutadiene (particularly the stereospecific polyisoprenes and polybutadienes), chlorosulfonated polyethylene (available under the trade name Hypalon), ethylene-propylene rubber (EPR), etc. The term "curing" as used herein is not limited to a cross-linking or similar reaction such as occurs with certain elastomeric materials such as polychloroprene, natural rubber, etc., but also embraces the heat treatment of elastomeric materials such as Hypalon so as to flow and bond the laminate as described irrespective of the nature of the chemical reactions, if any, which may occur. A specific curable elastic resin composition which may be satisfactorily employed in the invention is as follows:

TABLE

| Constituent: | Parts by weight |
| --- | --- |
| Natural rubber | 100.0 |
| Anti-oxidant | 0.5 |
| Wax | 1.0 |
| Titanium dioxide | 20.0 |
| Silicone | 3.0 |
| Lime | 0.5 |

Approximately two parts of benzoyl peroxide or dicumyl peroxide may be added to the rubber to insure non-staining of the fibers in the fabric base. The thickness of the resin coating desirable is approximately 0.01" but may vary from 0.005" to about 0.020". While in the apparatus shown, the resin is applied by a calender, it is understood that other means of application may be used as a dip roll, doctor blade, etc. The resin may also be applied to an adhesive surface as a silicone-coated paper sheet or a roll covered with polytetrafluoroethylene and offset onto the textile. Generally, the resin is applied as a uniform layer, but it may also be applied as a dot pattern or in some similar configuration. The drawing illustrates the application of the resin to the textile only. If desired, however, the resin may be applied only to substrate 19 or to both substrate 19 and to the textile. Where a sufficient thickness of resin is to be used, it may be sheeted out and fed to nip 31 from a separate supply roll.

The substrate 19 must be both resilient and heat-settable. Suitable substrates include fiberfill, an elastic foam, etc. Fiberfill is a nonwoven sheet of staple fibers bonded together by a suitable resin. Among the more-widely used fibers in fiberfill are cellulose acetate, cotton, and polyesters such as polyethylene terephthalate. Suitable elastic resin foams include foams prepared from natural rubber, polychloroprene, acrylic rubbers, styrene-butadiene rubbers, acrylonitrile-butadiene rubbers, and polyurethanes.

The compression blanket used in the process of the invention is an elastic resin foam whose thickness and density are both selected in correlation with the conditions of the process and the nature of the products to be produced. The foam must possess a high degree of resilience.

Suitable materials include, for example, foams of natural rubber, polyurethane, etc. When a material to be embossed passes through the device, the raised portions of the pattern on the embossing roll compress the blanket and the material therebetween, while the resilience of the blanket causes it to exert considerable force against any compression of the blanket by the material in the recessed portions of the pattern, i.e., two adjacent raised portions of the pattern tend to force the material against the blanket therebetween to compress it. Thus, whereas in conventional embossing, a force is applied against only the recessed part of the treated material (corresponding to the raised portions of the embossing roll), in the instant device the blanket asserts a positive force on the raised portions of the material so that both raised and recessed portions of the material are shaped by the application of positive force while being permanently heat-set. The compression blanket hence makes possible the use of frame molding in a continuous process. The use of frame molds for the embossing rolls makes possible achieving the desired pattern effects without careful engraving of the recessed portions of the embossing roll. If desired, additional decorative effects can be achieved by using an embossing roll wherein the pattern is defined by projecting portions of differing heights. The resilience of a pad for any given material is generally indicated by its density. For example, a low density pad should be used where it is desired to obtain a relatively shallow pattern with smooth rounded edges (as seen in cross-section). Using a denser pad under the same conditions results in squarer edges. To supply sufficient compression and resilience, the blanket or pad must be at least ¾″ thick. The maximum thickness is generally a matter of economics, though, to obtain certain specific effects as a particularly deep loft, etc. exceptionally thick blankets may be used. Generally, it is preferred to use a blanket from about 1–1½″ thick.

If desired, a third supply roller may supply scrim material 70 against the lower surface of the substrate 19 as it enters the nip between rolls 21 and 22 so that the composite laminate 28 includes the scrim as the bottom layer. In other variations an additional supply roller may be positioned to supply a second substrate material between the substrate 19 shown and the fabric, coating means may be provided to coat the substrate 19 with the resin binder either in addition to or instead of the coating on the fabric, etc.

The means for heating roll 21 is not critical. An electrical resistance member may be provided in the roll, desirably with a rheostat permitting setting of the desired temperature and a thremostat for maintaining the temperature uniform at the set temperature. If desired, means may be provided in roll 21 for circulating a heat-bearing fluid, such as steam or hot oil.

An alternative apparatus for practicing the invention is shown in FIGURE 2. The apparatus as there shown is mounted on a frame 40. The compression blanket 25 is not supported by guide rolls but merely hangs slackly from idler roll 22. Axis 24 of the idler roll 22 is journaled in bearings 41 mounted in bearing blocks 42 which are mounted in frame 40. Bearing blocks 42 can be moved vertically by means of vertically threaded shafts 43 which permit adjustment of the bearing blocks 42 along rails 44 set in frame 40. The axis 23 of embossing roll 21 is journaled in bearings 45 in bearing blocks 46 which are rigidly bolted to frame 40. Positive drive means for the embossing roll 21 is provided by variable speed motor 50 through reducing gears 48 and 49 and chain 47.

Heating means for embossing roll 21 is provided externally to the embossing roll by infrared lamps 51 positioned immediately above the embossing roll 21.

Figure 3:
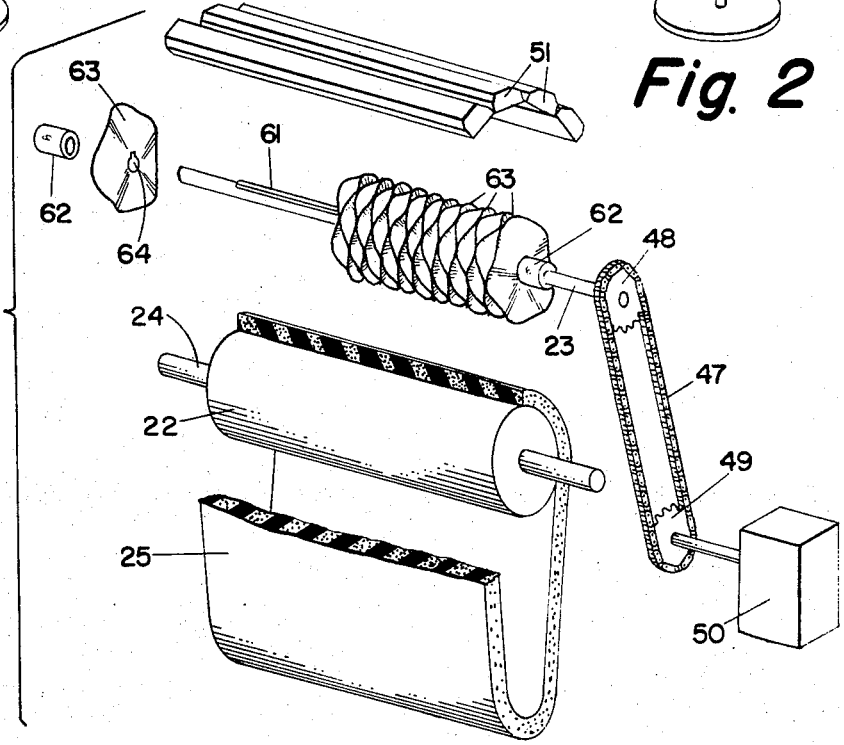
FIGURE 3 is an exploded view showing the major components of the apparatus of FIGURE 2.
Figure 4B:
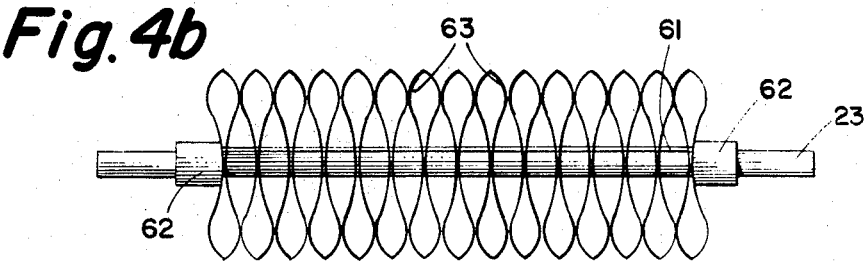

An exploded view of the major components of the unit is shown in FIGURE 3. The detail construction of the embossing roll is set forth in FIGURE 4. As there shown, the embossing roll comprises a shaft 23 containing a key 61 and end collars 62. The geometrical design on the roll is provided by discs 63 cut from suitably corrugated sheet metal and possessing a keyway 64 for engagement with the key 61 and shaft 23. A side view of the assembled embossing roll is shown in FIGURE 4(b). A cross-section of the nip between rolls 21 and 22 illustrating the process in operation is shown in FIGURE 5. As there shown, the raised portions of the discs contact the fabric, resin and substrate under conditions of correlated heat and pressure acting in conjunction with the compression pad and idler roll to produce the composite laminate.

The pressure exerted by the discs bearing against the compression pad or blanket not only compresses the compression pad and the laminate therebetween but also causes the compression pad to apply pressure in the areas of the laminate between adjacent discs, i.e. the interaction of the compression pad and the discs forces the material to be embossed into the cavities between the discs while assuring firm and uniform contact between the fabric and the substrate and maintaining this contact while heat is applied. The applied heat sets the fabric and/or the plastic coating in the shape desired. Thus, when a thermoplastic fiber is used in the fabric, the composite laminate retains its shape both by reason of the setting of the fibers and by reason of the setting of the plastic resin, while in the case of non-thermoplastic fibers, the resin coating is set in the desired configuration, thus affording a permanent set to the coated fabric. The temperature must be set according to nature of the fabric and the resin binder. Thus, to heat-set cellulose acetate fabrics using the apparatus shown, a temperature of from 300–350° F. should be used; while for nylon, the temperature should be from 400–465° F. For the elastomeric resin binder, thermosetting acrylic elastomer emulsions are commercially available which may be heat set at relatively low temperatures, as 300° F., followed by aging at room temperature. Polychloroprene and natural rubber materials require higher temperatures and/or longer times, as up to 450° F., desirably followed by an oven post-cure.

The pressure exerted by the compression blanket expanding in the void areas formed by the pattern on the embossing roll serves not only to assure a uniform cure in such areas between the substrate and the coated fabric but also controls the amount of loft or puff in the fabric. Thus, the careful control of these factors results in a controllable loft or quilting in the design. With proper selection of the fabric, the type of curvature obtainable in the composite laminate may be selected for a variety of effects. In addition, the temperature and pressure applied must be adjusted to give the desired loft and molded effect while not permitting the coating to strike through either the fabric or the filler. Thus, the resulting composite laminate has a flawlessly embossed fabric surface and, if desired, a smooth surface on the filler. The use of higher pressures between the compression blanket and the embossing roll causes the coating to strike through the filler. This is particularly desirable where a scrim fabric is used so as to assure that the filler is sandwiched between the two fabric surfaces in a permanent bond.

As an example, using the apparatus shown in FIGURE 2, with a six-inch diameter embossing roll, a temperature of from 300° to 400° F. was adequate at feed rates of 1 to 5 yards per minute (with the slower speed corresponding to the lower temperature) in producing a composite laminate of a fabric, coating and substrate. Similar results were obtained omitting the resin coating but raising the temperature to from 400° to 470° F. while maintaining the other conditions the same.

Using a compression pad in this apparatus of a rubber latex foam 1 in thick and having a density of 12 lb./cu. ft., it was found that composite laminates could be produced with the full range of fabric materials available, including all-way stretch nylon, tricot knit fabrics and woven fabrics possessing only bias stretch. The fabrics used under these conditions included cotton, rayon, nylon and spandex while the resin coating varied from 0.0005 to 0.020 inch. In addition, a nylon lace was run through the apparatus of FIGURE 2 with a polyester fiberfill for the substrate and spotting ⅛ inch dots of resin on 1 inch centers rather than applying the resin as a uniform coating. The embossing pattern and compression pad formed a pattern in this material with a ⅛ inch loft.

To illustrate the invention further, the following laminates were prepared using the apparatus illustrated in FIGURE 2 with a six-inch diameter embossing roll. Unless otherwise specified, the compression blanket was a rubber latex foam one inch thick and having a density of 12 pounds per cubic foot. Again unless otherwise stated, the bearing blocks 42 are set by means of shafts 43 so that embossing roll 21 compresses the blanket 25 to a thickness of one-eighth inch.

A one-way stretch nylon tricot was coated with a two mil thick coating of a thermosetting acrylic emulsion polymer of ethyl acrylate by knife-coating the emulsion onto an adhesive surface (in this case a polyethylene-coated paper) and then offsetting the coating onto the fabric. The coated nylon tricot and a polyurethane foam sheet ⅟₁₆ inch thick were passed through the apparatus at a rate of 2½ yards per minute and a temperature of about 450° F. (The temperatures given for the apparatus refer to the temperature as measured on the surface of the embossing roll and not the temperature of the laminate. Depending on the contact time, the temperature of the laminate will be somewhat less than the roll temperature.) The resulting laminate was permanently set in the pattern of the embossing rolls, the depressed areas of the pattern being a full ⅛ inch deep. A similar laminate was prepared under the same conditions using a nylon lace rather than the nylon tricot. Another laminate was prepared in the same manner using a cellulose acetate tricot at a temperature of about 350° F. In each case a permanently set pattern having depressed areas of a full ⅛ inch deep was obtained.

An all-way stretch jersey knit nylon was coated with a two mil thick coating of the acrylic emulsion described above and laminated to a sheet of 3.3 ounce polyester fiberfill by passing the materials through the embossing apparatus at a speed of 2½ yards per minute and a temperature of about 350° F. In this case a double compression blanket was used, the first being the blanket described above covered with a second blanket 1½ inches thick and having a density of 12 lbs. per cubic foot. The shafts 43 were adjusted so the embossing roll 21 compressed the composite blanket to ¼ inch. The resulting laminate had a pattern a full ³⁄₁₆ inch deep with a cleanly rounded cross-section.

A one-way stretch nylon was given a 10 mil thick coating of a polychloroprene adhesive composition by roller coating as described above. The fabric was then laminated to a ⅟₁₆ inch sheet of a polyurethane foam using the apparatus described with a temperature of about 400° F. and a speed of 2½ yards per minute. After passing through the embossing apparatus, the laminate was given a post-cure in an oven as described in FIGURE 1 for ten minutes at about 350° F. The laminate was permanently set in a pattern ⅛ inch deep. The run was repeated substituting a 3.3 ounce polyester fiberfill for the polyurethane foam. The results were as described for the foam except that the pattern was a full ³⁄₁₆ inch deep.

A nylon tricot fabric was roller coated with a 6 mil thick coating of polychloroprene adhesive and a ¼ inch thick sheet of a polyurethane foam was coated on one side only with a two mil thick coating of the acrylic elastomer emulsion described above using the offset coating method described. A sandwich of the coated tricot fabric and the urethane foam with the coated sides facing each other and a sheet of 3.3 ounce polyester fiberfill therebetween was fed to the embossing apparatus at a rate of 2.5 yards per minute with the embossing roll at a temperature of about 450° F. The resulting laminate was particularly suited for use in furniture construction.

While the embossing apparatus has been described as used in the production of laminates it is not limited to this application but may be used in producing other novel products wherein the use of correlated heat and pressure combined with the compression characteristics of the highly resilient compression blanket are essential to produce permanently set patterns in a thermoplastic material. Thus, fabrics made from thermoplastic yarns such as nylon or acetate lace or tricot material may be passed through the embossing apparatus of the invention to produce permanently set patterns in such delicate fabrics without any resin coating. Similarly, sheets of elastic foam may be permanently set onto the desired pattern configuration by use of this embossing apparatus.

It is apparent that the apparatus and process of the invention can be used to produce a wide gamut of novel designs and effects in composite laminates and other heat-settable materials heretofore not realizable and further that this may be done in an economic and convenient manner by means of the instant invention.

What is claimed is:

1. An apparatus comprising two rolls forming a nip therebetween, one of said rolls being an embossing roll, an elastic resin foam sheet at least about ¾" thick, positioned and disposed to move through said nip, controllable means to rotate at least said embossing roll, adjustable means to heat said embossing roll, means to regulate the height of said nip and means to pass at least one heat-settable sheet material at a uniform speed through said nip between said embossing roll and said foam sheet, said embossing roll comprising a shaft, a series of corrugated discs concentrically mounted on said shaft so that the edges of said discs form a design pattern and means for rigidly engaging said discs and said shaft.

References Cited
UNITED STATES PATENTS

| | | | |
|---|---|---|---|
| 2,693,221 | 11/1954 | Lyijynen | 156—582 X |
| 2,787,266 | 4/1957 | Scholl | 128—156 |
| 2,822,779 | 2/1958 | Schroeder | 118—637 |
| 3,251,727 | 5/1966 | Reynolds et al. | 161—148 |
| 3,257,263 | 6/1966 | Miller | 161—119 |
| 2,792,320 | 5/1957 | Bower | 161—89 |
| 2,915,787 | 12/1959 | Ewing et al. | 264—284 |
| 2,962,406 | 11/1960 | Rosa | 161—160 XR |

HAROLD ANSHER, Primary Examiner

H. F. EPSTEIN, Assistant Examiner

U.S. Cl. X.R.

18—10; 118—44; 264—284, 321